(12) United States Patent
Dahn et al.

(10) Patent No.: US 7,615,317 B2
(45) Date of Patent: Nov. 10, 2009

(54) N-OXIDE REDOX SHUTTLES FOR RECHARGEABLE LITHIUM-ION CELL

(75) Inventors: Jeffrey R. Dahn, Hubley (CA); Claudia Buhrmester, Prospect (CA)

(73) Assignee: 3M Innovative Properties Company, St. Paul, MN (US)

( * ) Notice: Subject to any disclaimer, the term of this patent is extended or adjusted under 35 U.S.C. 154(b) by 827 days.

(21) Appl. No.: 11/130,849

(22) Filed: May 17, 2005

(65) Prior Publication Data

US 2006/0263695 A1 Nov. 23, 2006

(51) Int. Cl.
*H01M 6/16* (2006.01)
(52) U.S. Cl. .......... 429/328; 429/330; 429/339; 429/218.1; 429/231.1; 429/231.95; 429/231.8; 429/231.4; 429/221; 429/224; 429/338; 429/341; 429/342; 429/223; 429/307; 429/231.2; 429/231.5; 429/231.3; 429/331; 429/332; 29/623.1; 29/623.2
(58) Field of Classification Search .......... 429/326, 429/329, 330, 339, 218.1, 231.1, 231.95, 429/231.8, 231.4, 221, 224, 328, 338, 341, 429/342, 223, 307, 231.2, 231.5, 231.3, 331, 429/332; 29/623.1, 623.2
See application file for complete search history.

(56) References Cited

U.S. PATENT DOCUMENTS

| | | | |
|---|---|---|---|
| 4,869,977 | A | 9/1989 | Connolly et al. |
| 5,976,731 | A | 11/1999 | Negoro et al. |
| 6,203,944 | B1 | 3/2001 | Turner et al. |
| 6,203,946 | B1 * | 3/2001 | Barker et al. ............ 429/231.1 |
| 6,908,709 | B2 * | 6/2005 | Miyaki ................. 429/231.1 |
| 6,942,949 | B2 * | 9/2005 | Besenhard et al. ....... 429/231.1 |
| 7,294,436 | B2 | 11/2007 | Abe et al. |
| 7,354,680 | B2 * | 4/2008 | Mikhaylik ............... 429/339 |
| 7,358,012 | B2 * | 4/2008 | Mikhaylik ............... 429/339 |
| 2001/0004507 | A1 | 6/2001 | Gan et al. |
| 2003/0044681 | A1 | 3/2003 | Morioka et al. |
| 2003/0190530 | A1 * | 10/2003 | Yang et al. ............... 429/224 |
| 2005/0156575 | A1 | 7/2005 | Mikhaylik |
| 2005/0221168 | A1 | 10/2005 | Dahn et al. |
| 2008/0050658 | A1 | 2/2008 | Abe et al. |

FOREIGN PATENT DOCUMENTS

| | | |
|---|---|---|
| EP | 1 528 616 A | 5/2005 |
| GB | 1066928 | 4/1967 |
| JP | 05-295058 | 11/1993 |
| JP | 07-302614 | 11/1995 |
| JP | 2000-235867 * | 8/2000 |
| JP | 2000-268861 * | 9/2000 |
| JP | 2001-015156 | 1/2001 |
| JP | 2001-023687 | 1/2001 |
| JP | 2001-283920 | 10/2001 |
| JP | 2002-298850 * | 10/2002 |
| JP | 2006 252917 A | 9/2006 |
| WO | WO 00/03444 | 1/2000 |
| WO | WO 01/73884 * | 10/2001 |
| WO | WO 2005/069405 A2 | 7/2005 |

OTHER PUBLICATIONS

T. J. Richardson, P. N. Ross, Jr., "Overcharge Protection for Rechargeable Lithium Polymer Electrolyte Batteries", *J. Electrochem. Soc.*, vol. 143, 3992-3996 (1996).
K. M. Colbow, J. R. Dahn, R. R. Haering, "Structure and Electrochemistry of the Spinel Oxides $LiTi_2O_4$ and $Li_{4/3}Ti_{5/3}O_4$", *J. Power Sources*, vol. 26, 397-402 (1989).
A. M. Wilson, "Lithium Insertion in Carbons Containing Nanodispersed Silicon", *J. Electrochem. Soc.*, vol. 142, 326-332 (1995).

* cited by examiner

*Primary Examiner*—Laura S Weiner
(74) *Attorney, Agent, or Firm*—Stephen F. Wolf

(57) ABSTRACT

A rechargeable lithium-ion cell contains a positive electrode, negative electrode, charge-carrying electrolyte containing charge carrying medium and lithium salt, and cycloaliphatic N-oxide compound dissolved in or dissolvable in the electrolyte. The N-oxide compound has an oxidation potential above the positive electrode recharged potential and serves as a cyclable redox chemical shuttle providing cell overcharge protection.

18 Claims, 11 Drawing Sheets

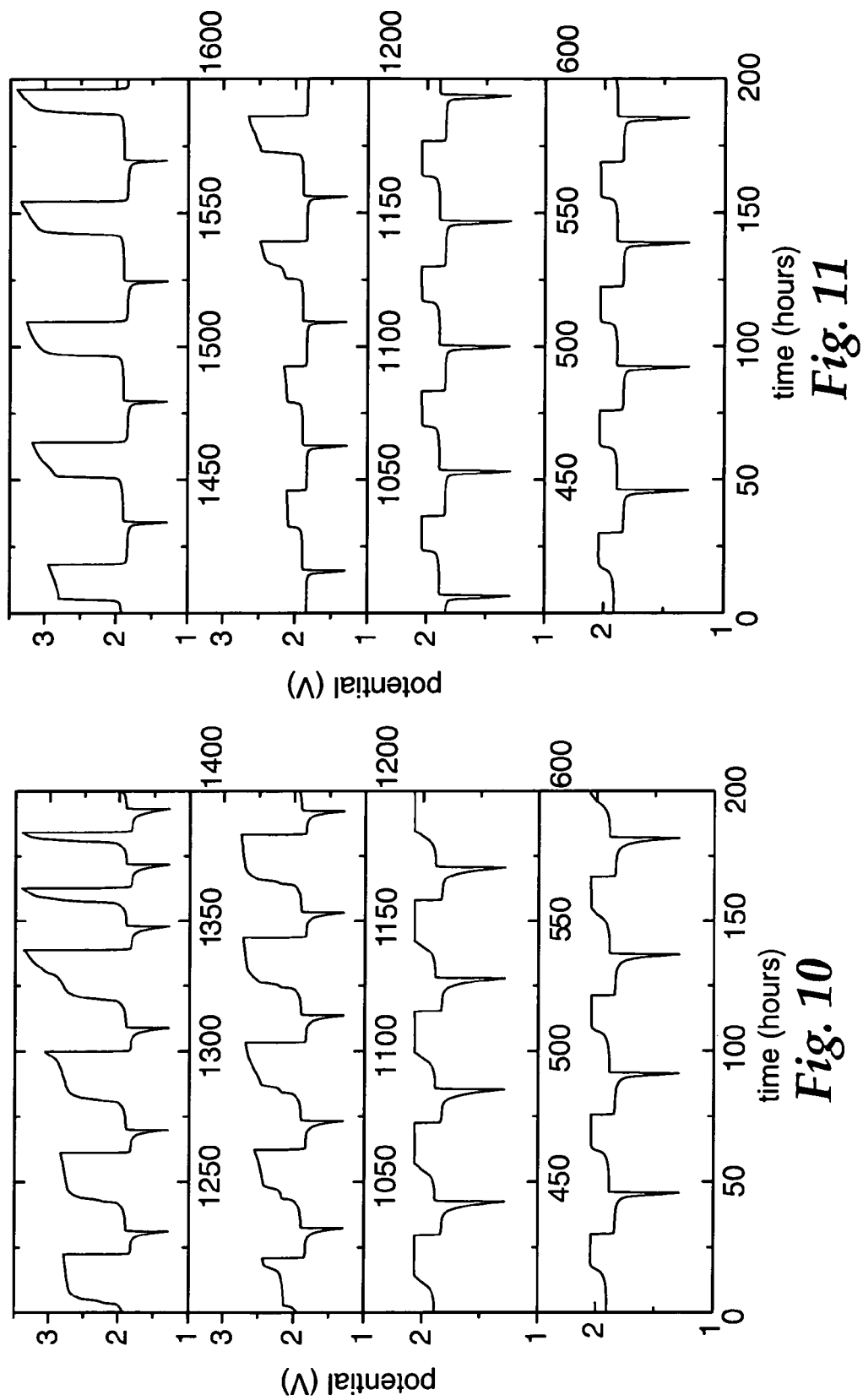

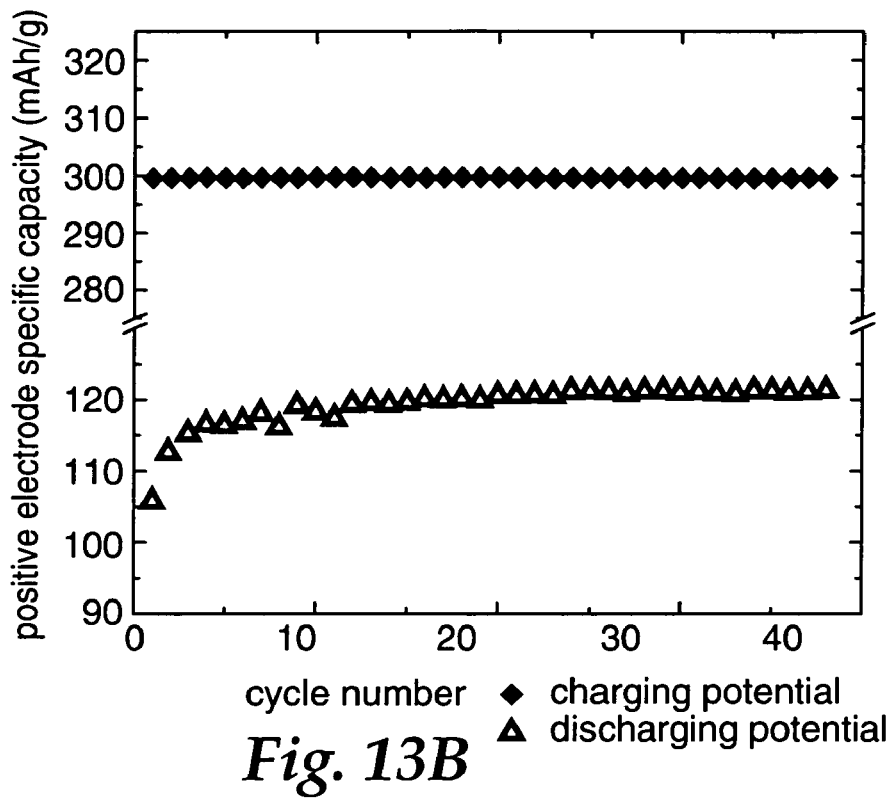
Fig. 13B
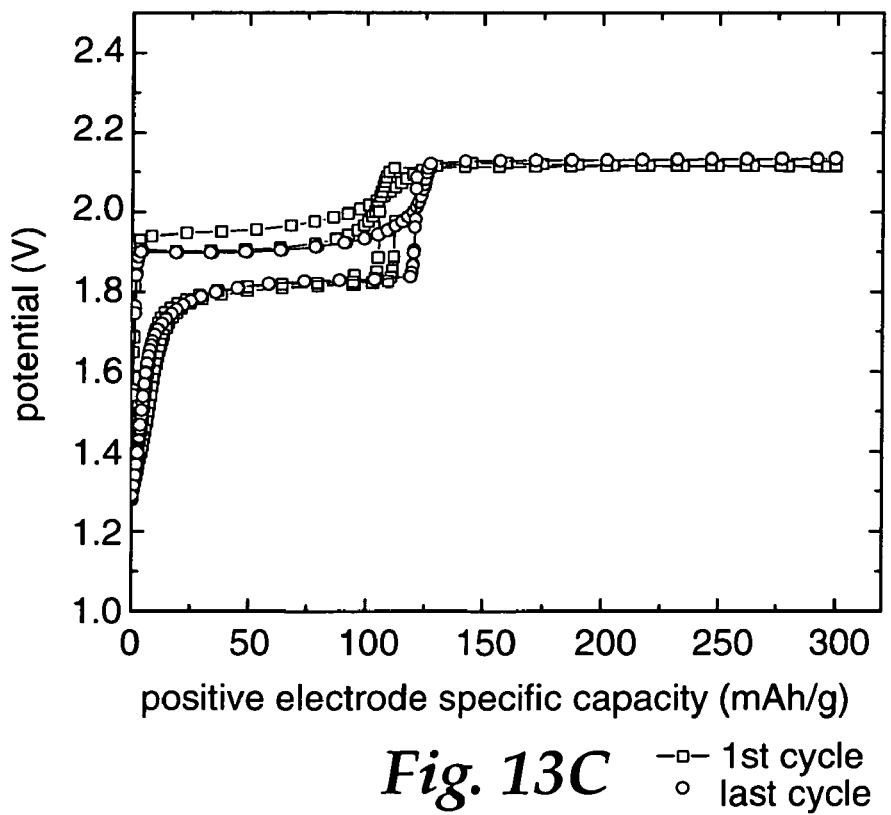
Fig. 13C  -□- 1st cycle
 ○ last cycle

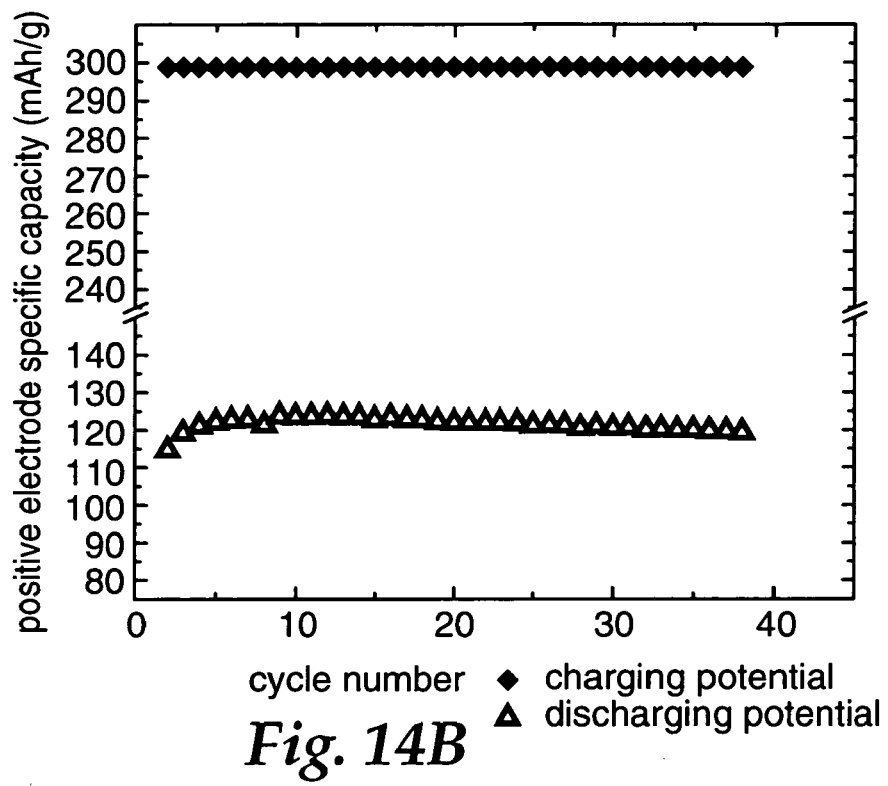
Fig. 14B
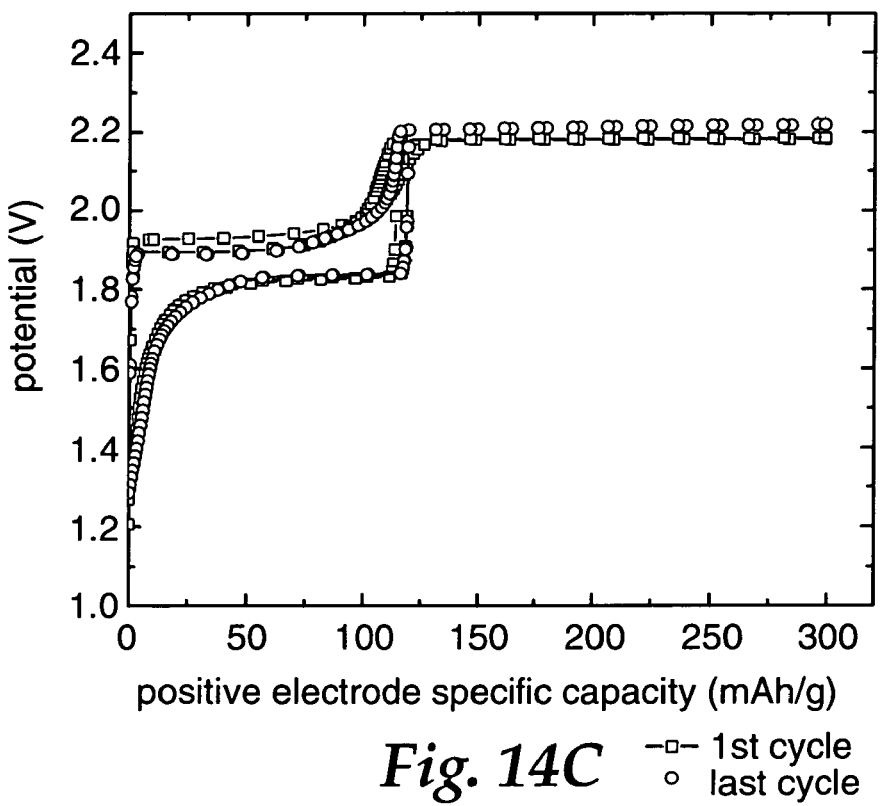
Fig. 14C   –□– 1st cycle
○ last cycle

N-OXIDE REDOX SHUTTLES FOR RECHARGEABLE LITHIUM-ION CELL

FIELD OF THE INVENTION

This invention relates to overcharge protection in rechargeable lithium-ion cells.

BACKGROUND

When properly designed and constructed, rechargeable lithium-ion cells can exhibit excellent charge-discharge cycle life, little or no memory effect, and high specific and volumetric energy. However, lithium-ion cells do have some shortcomings, including an inability to tolerate recharging to potentials above the manufacturer's recommended end of charge potential without degradation in cycle life; the danger of overheating, fire or explosion for cells recharged to potentials above the recommended end of charge potential; and difficulties in making large cells having sufficient tolerance to electrical and mechanical abuse for consumer applications. Single and connected (e.g., series-connected) lithium-ion cells typically incorporate charge control electronics to prevent individual cells from exceeding the recommended end of charge potential. This circuitry adds cost and complexity and has discouraged the use of lithium ion cells and batteries in low-cost mass market electrical and electronic devices such as flashlights, radios, CD players and the like. Instead, these low-cost devices typically are powered by non-rechargeable batteries such as alkaline cells.

Various chemical moieties have been proposed for imparting overcharge protection to rechargeable lithium-ion cells. Chemical moieties designated as "redox shuttles" or "shuttles" may in theory provide an oxidizable and reducible charge-transporting species that may repeatedly transport charge between the negative and positive electrodes once the charging potential reaches a desired value. Materials that function as fuses or shunts to provide one-time or limited-time cell overcharge protection have also been proposed.

N-oxide compounds have been used for various purposes in rechargeable lithium-ion cells. References involving such uses include U.S. Patent Application Publication Nos. US 2003/0044681 (Morioka et al.), US 2003/0096165 A1 (Nakahara et al.), US 2004/0197664 A1 (Iriyama et al.) and US 2004/0248004 A1 (Iwasa et al.); and Japanese Published Patent Application Nos. 2000-235867 (Asahi Denka Kogyo KK), 2000-268861 (Sanyo Electric Co., Ltd.), 2001-332296 (Japan Storage Battery Co., Ltd.) and 2003-132891 (NEC Corp.).

Other references relating to the use of nitrogen-containing compounds in rechargeable lithium-ion cells include U.S. Pat. No. 6,544,691 B1 (Guidotti) and U.S. Patent Application Publication Nos. US 2003/0099886 A1 (Choy et al. '886) and US 2003/0129499 A1 (Choy et al '499).

SUMMARY OF THE INVENTION

The invention provides in one aspect a rechargeable lithium-ion cell comprising:
(a) a positive electrode having a recharged potential;
(b) a negative electrode;
(c) a charge-carrying electrolyte comprising a charge carrying medium and a lithium salt; and
(d) a cyclable redox chemical shuttle comprising a cycloaliphatic N-oxide compound dissolved in or dissolvable in the electrolyte and having an oxidation potential above the recharged potential of the positive electrode.

The invention provides in another aspect a method for manufacturing a rechargeable lithium-ion sealed cell comprising the steps of assembling in any order and enclosing in a suitable case:
(a) a positive electrode having a recharged potential;
(b) a negative electrode;
(c) a charge-carrying electrolyte comprising a charge carrying medium and a lithium salt; and
(d) a cyclable redox chemical shuttle comprising a cycloaliphatic N-oxide compound dissolved in or dissolvable in the electrolyte and having an oxidation potential above the recharged potential of the positive electrode.

The invention provides in yet another aspect a method for recharging a lithium-ion cell while chemically limiting cell damage due to overcharging comprising supplying charging current across a positive electrode and a negative electrode of a lithium-ion rechargeable cell containing a charge-carrying electrolyte. The charge-carrying electrolyte comprises a charge carrying medium, a lithium salt and a cyclable redox chemical shuttle comprising a cycloaliphatic N-oxide compound dissolved in the electrolyte and having an oxidation potential above the recharged potential of the positive electrode.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

FIG. 4 through FIG. 12 respectively are plots showing cell potential during successive charge-discharge cycles for four time spans in the Example 3 through Example 11 cell charge-discharge tests.

FIG. 13B is a plot showing positive electrode specific capacity as a function of cycle number for the Example 12 cell.

FIG. 13C is a plot showing cell potential as a function of positive electrode specific capacity for the Example 12 cell.

FIG. 14B is a plot showing positive electrode specific capacity as a function of cycle number for the Example 13 cell.

FIG. 14C is a plot showing cell potential as a function of positive electrode specific capacity for the Example 13 cell.

DETAILED DESCRIPTION

Figure 1:
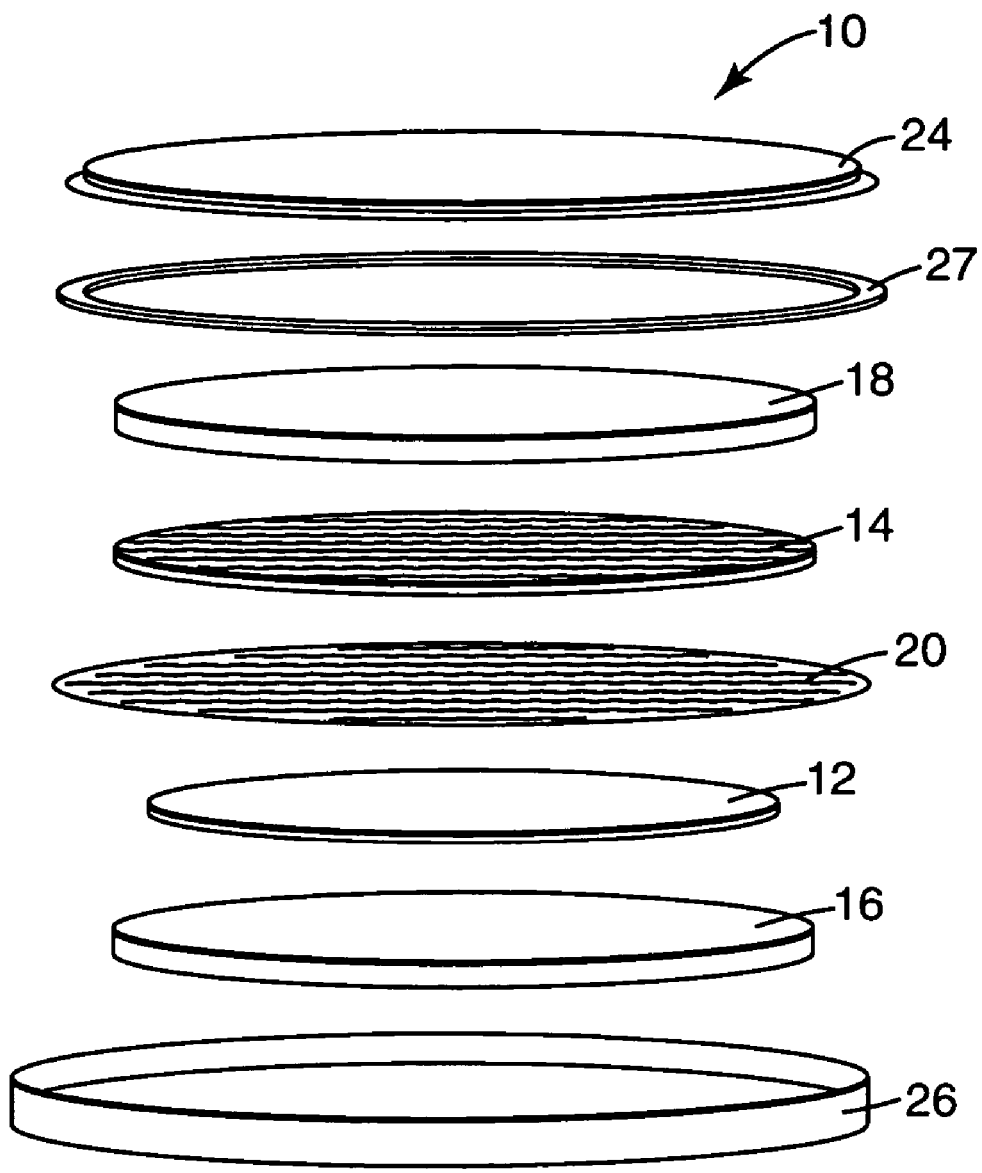
FIG. 1 is an exploded perspective schematic view of an electrochemical cell.

The phrase "positive electrode" refers to one of a pair of rechargeable lithium-ion cell electrodes that under normal circumstances and when the cell is fully charged will have the highest potential. We retain this terminology to refer to the same physical electrode under all cell operating conditions even if such electrode temporarily (e.g., due to cell overdischarge) is driven to or exhibits a potential below that of the other (the negative) electrode.

The phrase "negative electrode" refers to one of a pair of rechargeable lithium-ion cell electrodes that under normal circumstances and when the cell is fully charged will have the lowest potential. We retain this terminology to refer to the same physical electrode under all cell operating conditions even if such electrode is temporarily (e.g., due to cell overdischarge) driven to or exhibits a potential above that of the other (the positive) electrode.

The phrase "redox chemical shuttle" refers to an electrochemically reversible moiety that during charging of a lithium-ion cell can become oxidized at the positive electrode, migrate to the negative electrode, become reduced at the negative electrode to reform the unoxidized (or less-oxidized) shuttle species, and migrate back to the positive electrode.

When used with respect to a positive electrode, the phrase "recharged potential" refers to a value $E_{cp}$ measured relative to Li/Li$^+$ by constructing a cell containing the positive electrode, a lithium metal negative electrode and an electrolyte but no redox chemical shuttle, carrying out a charge/discharge cycling test and observing the potential at which the positive electrode becomes delithiated during the first charge cycle to a lithium level corresponding to at least 90% of the available recharged cell capacity. For some positive electrodes (e.g., LiFePO$_4$), this lithium level may correspond to approximately complete delithiation (e.g., to Li$_0$FePO$_4$). For other positive electrodes (e.g., some electrodes having a layered lithium-containing structure), this lithium level may correspond to partial delithiation.

The word "cyclable" when used in connection with a redox chemical shuttle refers to a material that when exposed to a charging voltage sufficient to oxidize the material (e.g., from a neutral to a cationic form, or from a less-oxidized state to a more oxidized state) and at an overcharge charge flow equivalent to 100% of the cell capacity will provide at least two cycles of overcharge protection for a cell containing the chosen positive electrode.

The term "phase" refers to a homogeneous liquid portion that is present or that can form in a liquid system. The term "phases" refers to the presence of more than one phase in a heterogeneous liquid system. When used with respect to a mixture of a redox chemical shuttle and electrolyte, the terms "dissolved" and "dissolvable" refer to a shuttle that when present in or added to the electrolyte forms or will form a single phase solution containing a mobile charge-carrying moiety in an amount sufficient to provide overcharge protection at a charging current rate sufficient to charge fully in 10 hours or less a lithium-ion cell containing the chosen positive electrode, negative electrode and electrolyte.

When used with respect to a redox chemical shuttle, the phrase "oxidation potential" refers to a value $E_{cv}$. $E_{cv}$ may be measured by dissolving the shuttle in the chosen electrolyte, measuring current flow vs. voltage using cyclic voltammetry and a platinum or glassy carbon working electrode, a copper counter electrode and a non-aqueous Ag/AgCl reference electrode that has been previously referenced to Li/Li$^+$ and determining the potentials $V_{up}$ (viz., during a scan to more positive potentials) and $V_{down}$ (viz., during a scan to more negative potentials), relative to Li/Li$^+$, at which peak current flow is observed. $E_{cv}$ will be the average of $V_{up}$ and $V_{down}$. Shuttle oxidation potentials may be closely estimated (to provide a value "$E_{obs}$") by constructing a cell containing the shuttle, carrying out a charge/discharge cycling test, and observing during a charging sequence the potential at which a voltage plateau indicative of shuttle oxidation and reduction occurs. The observed result may be corrected by the amount of the negative electrode potential vs. Li/Li$^+$ to provide an $E_{obs}$ value relative to Li/Li$^+$. Shuttle oxidation potentials may be approximated (to provide a value "$E_{calc}$") using modeling software such as GAUSSIAN 03™ from Gaussian Inc. to predict oxidation potentials (e.g., for compounds whose $E_{cv}$ is not known) by correlating model ionization potentials to the oxidation potentials and lithium-ion cell behavior of measured compounds.

A variety of positive electrodes may be employed in the disclosed lithium-ion cells. Some positive electrodes may be used with a wide range of N-oxide compounds, whereas other positive electrode materials having relatively high recharged potentials may be usable only with a smaller range of N-oxide compounds having suitably higher oxidation potentials. Representative positive electrodes and their approximate recharged potentials include FeS$_2$ (3.0 V vs. Li/Li$^+$), LiCoPO$_4$ (4.8 V vs. Li/Li$^+$), LiFePO$_4$ (3.45 V vs. Li/Li$^+$), Li$_2$FeS$_2$ (3.0 V vs. Li/Li$^+$), Li$_2$FeSiO$_4$ (2.9 V vs. Li/Li$^+$), LiMn$_2$O$_4$ (4.1 V vs. Li/Li$^+$), LiMnPO$_4$ (4.1 V vs. Li/Li$^+$), LiNiPO$_4$ (5.1 V vs. Li/Li$^+$), LiV$_3$O$_8$ (3.7 V vs. Li/Li$^+$), LiV$_6$O$_{13}$ (3.0 V vs. Li/Li$^+$), LiVOPO$_4$ (4.15 V vs. Li/Li$^+$), LiVOPO$_4$F (4.3 V vs. Li/Li$^+$), Li$_3$V$_2$(PO$_4$)$_3$ (4.1 V (2 Li) or 4.6 V (3 Li) vs. Li/Li$^+$), MnO$_2$ (3.4 V vs. Li/Li$^+$), MoS$_3$ (2.5 V vs. Li/Li$^+$), sulfur (2.4 V vs. Li/Li$^+$), TiS$_2$ (2.5 V vs. Li/Li$^+$), TiS$_3$ (2.5 V vs. Li/Li$^+$), V$_2$O$_5$ (3.6 V vs. Li/Li$^+$), V$_6$O$_{13}$ (3.0 V vs. Li/Li$^+$), and combinations thereof. Powdered lithium (e.g., LECTRO™ MAX stabilized lithium metal powder, from FMC Corp., Gastonia, N.C.) may be included in the positive electrode as formed. Lithium may also be incorporated into the negative electrode so that extractible lithium will be available for incorporation into the positive electrode during initial discharging. Some positive electrode materials may depending upon their structure or composition be charged at a number of voltages, and thus may be used as a positive electrode if an appropriate form and appropriate cell operating conditions are chosen. Electrodes made from LiFePO$_4$, Li$_2$FeSiO$_4$, Li$_x$MnO$_2$ (where x is about 0.3 to about 0.4, and made for example by heating a stoichiometric mixture of electrolytic manganese dioxide and LiOH to about 300 to about 400° C.) or MnO$_2$ (made for example by heat treatment of electrolytic manganese dioxide to about 350° C.) can provide cells having especially desirable performance characteristics when used with N-oxide compounds having oxidation potentials of about 3.6 to about 4.0 V. The positive electrode may contain additives as will be familiar to those skilled in the art, e.g., carbon black, flake graphite and the like. As will be appreciated by those skilled in the art, the positive electrode may be in any convenient form including foils, plates, rods, pastes or as a composite made by forming a coating of the positive electrode material on a conductive current collector or other suitable support.

A variety of negative electrodes may be employed in the disclosed lithium-ion cells. Representative negative electrodes include graphitic carbons e.g., those having a spacing between (002) crystallographic planes, $d_{002}$ of 3.45

Å>$d_{002}$>3.354 Å and existing in forms such as powders, flakes, fibers or spheres (e.g., mesocarbon microbeads); lithium metal; $Li_{4/3}Ti_{5/3}O_4$; the lithium alloy compositions described in U.S. Pat. No. 6,203,944 (Turner '944) entitled "ELECTRODE FOR A LITHIUM BATTERY" and PCT Published Patent Application No. WO 00103444 (Turner PCT) entitled "ELECTRODE MATERIAL AND COMPOSITIONS"; Sn—Co-based amorphous negative electrodes (e.g., the negative electrode in the NEXELION™ hybrid lithium ion battery from Sony Corp.); and combinations thereof. A negative electrode containing extractible lithium (e.g., a lithium metal electrode, extractible lithium alloy electrode, or electrode containing powdered lithium) may be employed so that extractible lithium will be incorporated into the positive electrode during initial discharging. The negative electrode may contain additives as will be familiar to those skilled in the art, e.g., carbon black. As will be appreciated by those skilled in the art, the negative electrode may be in any convenient form including foils, plates, rods, pastes or as a composite made by forming a coating of the negative electrode material on a conductive current collector or other suitable support.

The electrolyte provides a charge-carrying pathway between the positive and negative electrodes, and initially contains at least the charge carrying media and the lithium salt. The electrolyte may include other additives that will be familiar to those skilled in the art. As will be appreciated by those skilled in the art, the electrolyte may be in any convenient form including liquids and gels.

A variety of charge carrying media may be employed in the electrolyte. Exemplary media are liquids or gels capable of solubilizing sufficient quantities of lithium salt and redox chemical shuttle so that a suitable quantity of charge can be transported from the positive electrode to negative electrode. Exemplary charge carrying media can be used over a wide temperature range, e.g., from about −30° C. to about 70° C. without freezing or boiling, and are stable in the electrochemical window within which the cell electrodes and shuttle operate. Representative charge carrying media include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butyrolactone, methyl difluoroacetate, ethyl difluoroacetate, dimethoxyethane, diglyme (bis(2-methoxyethyl)ether) and combinations thereof.

A variety of lithium salts may be employed in the electrolyte. Exemplary lithium salts are stable and soluble in the chosen charge-carrying media and perform well in the chosen lithium-ion cell, and include $LiPF_6$, $LiBF_4$, $LiClO_4$, lithium bis(oxalato)borate ("LiBOB"), $LiN(CF_3SO_2)_2$, $LiN(C_2F_5SO_2)_2$, $LiAsF_6$, $LiC(CF_3SO_2)_3$ and combinations thereof.

The electrolyte also conveniently contains the dissolved redox chemical shuttle. The electrolyte may however if desired be formulated without dissolved redox chemical shuttle, and incorporated into a cell whose positive or negative electrode contains dissolvable redox chemical shuttle that can dissolve into the electrolyte after cell assembly or during the first charge-discharge cycle, so that the electrolyte will contain dissolved redox chemical shuttle once the cell has been put into use.

A variety of cycloaliphatic N-oxide redox shuttle compounds may be employed in the disclosed lithium-ion cells. When an attempt is made to charge the cell above the shuttle compound oxidation potential, the oxidized shuttle molecules carry a charge quantity corresponding to the applied charging current to the negative electrode, thus preventing cell overcharge. Especially preferred shuttle materials are sufficiently cyclable to provide at least 10, at least 15, at least 30, at least 50, at least 80 or at least 100 cycles of overcharge protection at a charging voltage sufficient to oxidize the material and at an overcharge charge flow equivalent to 100% of the cell capacity during each cycle. The N-oxide compound is different from the positive electrode and has an oxidation potential different from and higher (viz., more positive) than the positive electrode recharged potential. The N-oxide compound oxidation potential desirably is just slightly higher than the positive electrode recharged potential, below the potential at which irreversible cell damage might occur, and desirably below the potential at which excessive cell heating or outgassing might occur. As a general numeric guide for typical lithium-ion cell constructions, the N-oxide compound may for example have an oxidation potential from about 0.3 V to about 5 V above the positive electrode recharged potential; from about 0.3 to about 1 V above the positive electrode recharged potential; or from about 0.3 to about 0.6 V above the positive electrode recharged potential. For example, $LiFePO_4$ positive electrodes have a recharged potential of about 3.45 V vs. $Li/Li^+$, and exemplary N-oxide compounds for use with such electrodes desirably have an oxidation potential of about 3.7 to about 4.5 V vs. $Li/Li^+$. $Li_2FeSiO_4$ positive electrodes have a recharged potential of around 2.8 V vs. $Li/Li^+$, and exemplary N-oxide compounds for use with such electrodes desirably have an oxidation potential of about 3.1 to about 3.8 V vs. $Li/Li^+$. $Li_xMnO_2$ (where x is about 0.3 to 0.4) and $MnO_2$ positive electrodes have a recharged potential of about 3.4V vs. $Li/Li^+$, and exemplary N-oxide compounds for use with such electrodes desirably have an oxidation potential of about 3.7 to about 4.4 V vs. $Li/Li^+$.

The N-oxide compound may contain one or more than one cycloaliphatic ring. For example, the N-oxide moiety may be part of a heterocyclic ring, e.g. a piperidinyl or pyrrolidinyl ring. The N-oxide compound may be unsubstituted or substituted at one or more ring positions, and may have more than one substituent group attached to a ring carbon atom. Exemplary substituents include alkyl groups (containing, for example, 1 to about 4 carbon atoms, such as methyl, ethyl, propyl, isopropyl, butyl, sec-butyl or tert-butyl groups), haloalkyl groups (containing, for example, 1 to about 4 carbon atoms) and perhaloalkyl groups (containing, for example, 1 to about 4 carbon atoms). Other exemplary substituents include acyl (e.g., acetyl), acyloxy, alkaryl, alkoxy, acetamido, amido, amino, aryl, aralkyl, alkyl carboxyl, aryl carboxyl, alkylsulfonyl, benzoyl, carbamoyl, carbamido, carboxy, cyano, formyl, halo, haloacetamido, haloacyl (e.g., perfluoroacyl), haloalkylsulfonyl (e.g., perfluoroalkylsulfonyl), haloaryl (e.g., perfluoroaryl), hydroxyl, isothiocyanato, methylsulfonyloxyl, nitro, oxo, oxybenzoyl or phosphenoxy groups, and combinations thereof. Through appropriate ligand substitution, the N-oxide compound oxidation potential may be raised or lowered to provide better recharge protection for a desired positive electrode material. The N-oxide compound may have one or more alkyl groups attached to the carbon atoms adjacent or alpha- to the N-oxide moiety, e.g., a tetraalkyl cycloaliphatic N-oxide compound having alkyl groups attached to both α-carbon atoms. The N-oxide compound may be a salt, e.g., salts containing metal cation complexes, quaternary ammonium salts or phosphonium salts. The N-oxide compound may contain additional substituents so long as such additional substituents do not unduly interfere with the N-oxide compound's charge-carrying capability, oxidation potential, solubility in the electrolyte or stability. For example, the N-oxide compound desirably does not contain readily-polymerizable substituents (e.g., allyl groups).

Especially preferred cycloaliphatic N-oxides include 2,2,6,6-tetraalkyl-1-piperidinyl N-oxide compounds (TEMPO compounds) having a substituent or substituents at the 3, 4, or 5 ring positions and 2,2,5,5-tetraalkyl-1-pyrrolidinyl N-oxide compounds (PROXYL compounds) having a substituent or substituents at the 3 or 4 ring positions. Several exemplary cycloaliphatic N-oxide compounds and their oxidation potentials $E_{cv}$ (or where noted, their $E_{obs}$ or $E_{calc}$ values) are shown below in Table A. For some of the $E_{calc}$ entries, values for both the equatorial, axial ("e, a") and equatorial, equatorial ("e, e") configurations are shown:

TABLE A

Cycloaliphatic N-Oxide Compounds and Their Oxidation Potentials

| Name | Structure | Oxidation Potential (V vs. Li/Li$^+$) |
|---|---|---|
| 2,2,6,6-tetramethyl-1-piperidinyl N-oxide (TEMPO) | | 3.53 ($E_{cv}$)<br>3.45 ($E_{obs}$)<br>3.56 ($E_{calc}$) |
| 4-oxo-TEMPO | | 3.67 ($E_{cv}$)<br>3.67 ($E_{obs}$)<br>3.82 ($E_{calc}$) |
| 4-methoxy-TEMPO | | 3.60 ($E_{cv}$)<br>3.45 ($E_{obs}$)<br>3.54 (e, a); 3.63(e, a) ($E_{calc}$) |
| 4-cyano-TEMPO | | 3.61 ($E_{obs}$)<br>3.72(e, a); 3.73(e, a) ($E_{calc}$) |
| 4-oxybenzoyl-TEMPO | | 3.58 ($E_{obs}$) |
| 2,2,5,5-tetraalkyl-3-cyano-1-pyrrolidinyl N-oxide (3-cyano-PROXYL) | | 3.69 ($E_{obs}$)<br>3.86 (e, a); 3.88 (e, a) ($E_{calc}$) |

TABLE A-continued

Cycloaliphatic N-Oxide Compounds and Their Oxidation Potentials

| Name | Structure | Oxidation Potential (V vs. Li/Li$^+$) |
|---|---|---|
| 3-carbamido-PROXYL | [structure] | 3.77 ($E_{calc}$) |
| 4-carboxy-TEMPO | [structure] | 3.66 ($E_{obs}$) |

Other exemplary N-oxide compounds include, but are not limited to, 3-amino-TEMPO, 3-carboxy-TEMPO, 3-cyano-TEMPO, 3-(2-bromoacetamido)-TEMPO, 3-hydroxy-TEMPO, 3-(2-iodoacetamido)-TEMPO, 3-methoxy-TEMPO, 4-benzyloxy-TEMPO, 4-hydroxy-TEMPO, 4-amino-TEMPO, 4-(2-bromoacetamido)-TEMPO, 4-(2-chloroacetamido)-TEMPO, 4-(2-iodoacetamido)-TEMPO, 4-carbamido-TEMPO, 4-methylsulfonyloxy-TEMPO, 4-isothiocyanato-TEMPO, 4-phosphonoxy-TEMPO, 2,2,5,5-tetramethyl-1-pyrrolidinyl N-oxide (PROXYL), 3-hydroxy-PROXYL, 3-methoxy-PROXYL, 3-amino-PROXYL, 3-(2-bromoacetamido)-PROXYL, 3-(2-iodoacetamido)-PROXYL, and the like.

Mixtures of two or more shuttle materials having different electrochemical potentials vs. Li/Li$^+$ may also be employed. For example, a first shuttle material operative at 3.7V and a second shuttle material operative at 3.9V may both be employed in a single cell. If after many charge/discharge cycles the first shuttle material degrades and loses its effectiveness, the second shuttle material (which would not meanwhile have been oxidized while the first shuttle material was operative) could take over and provide a further (albeit higher $E_{cv}$) margin of safety against overcharge damage.

The shuttle material can also provide overdischarge protection to a cell or to a battery of series-connected cells, as described further in copending U.S. patent application Ser. No. 11/095,185, entitled "REDOX SHUTTLE FOR OVERDISCHARGE PROTECTION IN RECHARGEABLE LITHIUM-ION BATTERIES", filed Mar. 31, 2005, the disclosure of which is incorporated herein by reference.

The N-oxide compound is dissolved or dissolvable in the electrolyte in an amount sufficient to provide overcharge protection at the intended charging rate. According to the literature (Richardson et al., *J. Electrochem. Soc.* Vol. 143, 3992 (1996)) the maximum shuttle current for a singly ionized shuttle is given by $$I_{max} = FADC/d, \quad [1]$$

where F is Faraday's number, A is the electrode area, D is an effective diffusion constant of the shuttle species (taking into account both oxidized and reduced forms of the shuttle), C is the total concentration of the shuttle species and d is the distance between the electrodes. To obtain a large shuttle current, the electrolyte should impart a large diffusion constant D to the shuttle and support a high shuttle concentration C. Thus the electrolyte desirably initially or eventually contains an ample dissolved quantity of suitably mobile N-oxide compound. The shuttle diffusion constant D usually will increase as the electrolyte solution viscosity decreases. Exemplary concentrations of the N-oxide compound in the electrolyte are about 0.05 M up to the limit of solubility, more than 0.1 M up to the limit of solubility, about 0.2 M up to the limit of solubility or about 0.3 M up to the limit of solubility. The N-oxide compound concentration may in some instances be increased by incorporating a suitable cosolvent in the electrolyte. Exemplary cosolvents include acetonitrile, ethers (e.g., dimethyl ether), esters (e.g., ethyl acetate or methyl acetate), lactones (e.g., gamma-butyrolactone), tetrahydrofuran and combinations thereof.

The disclosed lithium-ion cells may include a porous cell separator located between the positive and negative electrodes and through which charge-carrying species (including the oxidized or reduced shuttle compound) may pass. Suitable separators will be familiar to those skilled in the art. The disclosed cells may be sealed in a suitable case, e.g., in mating cylindrical metal shells such as in a coin-type cell, in an elongated cylindrical AAA, AA, C or D cell casing or in a replaceable battery pack as will be familiar to those skilled in the art. The disclosed cells may be used in a variety of devices, including portable computers, tablet displays, personal digital assistants, mobile telephones, motorized devices (e.g., personal or household appliances and vehicles), instruments, illumination devices (e.g., flashlights) and heating devices. The disclosed cells may have particular utility in low-cost mass market electrical and electronic devices such as flashlights, radios, CD players and the like, which heretofore have usually been powered by non-rechargeable batteries such as alkaline cells. Further details regarding the construction and use of rechargeable lithium-ion cells will be familiar to those skilled in the art.

The invention is further illustrated in the following illustrative examples, in which all parts and percentages are by weight unless otherwise indicated.

Examples 1-14

Negative electrodes were made from $Li_{4/3}Ti_{5/3}O_4$ (synthesized according to the procedure shown in K. M. Colbow, R. R. Haering and J. R. Dahn, "Structure and Electrochemistry of the Spinel Oxides $LiTi_2O_4$ and $Li_{4/3}Ti_{5/3}O_4$", *J. Power Sources*, 26, 397-402 (1989)) or from mesocarbon microbeads ("MCMB", a graphitic carbon with $3.45 > d_{002} > 3.354$ Å, obtained from E-One/Moli Energy Canada, Maple Ridge, B.C., Canada), using the following procedure. 100 Parts of the negative electrode active material (viz., $Li_{4/3}Ti_{5/3}O_4$ or MCMB), 5 parts KYNAR™ 301P polyvinylidene fluoride (commercially available from Atofina Chemicals, Philadelphia, Pa.) and 5 parts SUPER S™ Carbon Black (commercially available from MMM Carbon, Tertre, Belgium) were mixed with N-methylpyrrolidinone to form a slurry. After thorough mixing in a polyethylene bottle containing spheres of ZIRCOA™ 6.35 mm diameter zirconium oxide banded satellite spherical media (commercially available from Zircoa, Inc., Solon, Ohio), the slurry was coated in a thin film on a current collector (aluminum foil for $Li_{4/3}Ti_{5/3}O_4$ negative electrodes and copper foil for MCMB negative electrodes). The resulting coated electrode foil was dried in air overnight at 90° C. Individual 1.3 cm diameter electrode discs were cut from the electrode foil using a precision punch. Positive electrodes were made the same way using $LiFePO_4$ (commercially available from Phostech Lithium, Ste-Foy, Quebec, Canada) as the active material and an aluminum foil current collector.

Electrolytes were prepared by dissolving the molar amounts indicated below in Table 1 of the indicated N-oxide compounds and 0.5 M of the indicated lithium salts in the charge carrying media propylene carbonate ("PC"), dimethyl carbonate ("DMC"), ethylene carbonate ("EC") and diethyl carbonate ("DEC") in a 1:2:1:2 PC/DMC/EC/DEC volume ratio to form single phase electrolyte solutions. The N-oxide compounds were obtained from Sigma-Aldrich Co. (Milwaukee, Wis.). Lithium bisoxalatoborate ("LiBOB") was obtained from Chemetall Group of Dynamit Nobel AG, Troisdorf, Germany, and $LiPF_6$ (manufactured by Stella Chemifa Corp., Japan) was obtained from E-One/Moli Energy Canada. The charge carrying media were obtained from E-One/Moli Energy Canada.

Coin-type test cells were built in 2325 coin cell hardware as described in A. M. Wilson and J. R. Dahn, *J. Electrochem. Soc.*, 142, 326-332 (1995). An exploded perspective schematic view of a 2325 coin cell 10 is shown in FIG. 1. Stainless steel cap 24 and oxidation resistant case 26 enclosed the cell and served as the negative and positive terminals respectively. The negative electrode 14 was formed from $Li_{4/3}Ti_{5/3}O_4$ or MCMB coated on copper foil current collector 18 as described above, and precharged as described below. The positive electrode 12 was formed from $LiFePO_4$ coated on aluminum foil current collector 16 as described above. Separator 20 was formed from CELGARD™ No. 2500 microporous material having a 25 micrometer thickness, and wetted with electrolyte. Gasket 27 provided a seal and separated the two terminals. A tightly squeezed stack was formed when the cell was crimped closed.

The $Li_{4/3}Ti_{5/3}O_4$ or MCMB negative electrodes were 30% or 50% precharged in order to provide negative electrodes for the Li-ion cells with an initially known potential of 1.55V for the titanate electrode and about 0.1 V for the MCMB electrode vs. Li metal. The precharging procedure was carried out as follows: A 2325 coin cell was assembled with $Li_{4/3}Ti_{5/3}O_4$ or MCMB as the positive electrode, lithium metal as the negative electrode and 0.5M LiBOB in a 1:2:1:2 volume ratio mixture of EC/DEC/PC/DMC as the electrolyte. The cell was discharged for 180 or 300 minutes at a rate sufficient to consume the cell capacity in 10 hours. This corresponded to a 30% or 50% discharge of the positive electrode, and incorporated lithium into the $Li_{4/3}Ti_{5/3}O_4$ or MCMB electrode in an amount equivalent to 30% or 50% of the total capacity of such electrode. The partially discharged coin cell was taken apart in a glove box and the $Li_{4/3}Ti_{5/3}O_4$ or MCMB electrodes removed and reassembled in the shuttle test cell as negative electrodes, without further treatment. The negative electrode total capacity was selected to be about 60% to 100% more than the positive electrode total capacity so that the negative electrode would not be completely filled by lithium before the positive electrode reached $E_{cp}$. The assembled cells were cycled at 30° C. using "C/20" (20 hour charge and 20 hour discharge), "C/10" (10 hour charge and 10 hour discharge) or "C/5" (5 hour charge and 5 hour discharge) rates using a computer-controlled charge-discharge testing unit produced by E-One/Moli Energy Canada.

Negative electrodes made from $Li_{4/3}Ti_{5/3}O_4$ and positive electrodes made from $LiFePO_4$ each had a specific capacity of about 140 mAh/g before precharging. Thus a 140 mA/g specific current could discharge a fully charged cell containing such electrodes in one hour, and would represent a "1C" rate for such cells. These cells were discharged to 1.0 or 1.3 V and were charged to a fixed capacity or until an upper cutoff of 3.4 V was reached. Since $Li_{4/3}Ti_{5/3}O_4$ has a recharged potential near 1.55 V vs. $Li/Li^+$, the 1.0, 1.3 and 3.4 V cell potentials correspond to potentials of about 2.55, 2.85 and 4.95 V vs. $Li/Li^+$.

Negative electrodes made from MCMB had a specific capacity of about 300 mAh/g before precharging. Thus a 300 mA/g specific current could discharge a fully charged cell containing such electrodes in one hour. Cells made using these MCMB negative electrodes and 140 mAh/g $LiFePO_4$ positive electrodes were charged and discharged using C-rates based on the positive electrode capacity. Because the MCMB negative electrode had more than twice the capacity of the $LiFePO_4$ positive electrode, C-rates referenced to the negative electrode capacity would be less than one-half as large as those referenced to the positive electrode capacity. The MCMB negative electrode cells were discharged to 2.5 V and charged to a fixed capacity or until an upper cutoff of 4.0 V was reached. In these cells the MCMB negative electrode reaches about 0.07 V vs. $Li/Li^+$ when the $LiFePO_4$ positive electrode becomes fully charged and thus the cutoff potential vs. MCMB is approximately 4.00 V vs. MCMB or 4.07 V vs. $Li/Li^+$.

The shuttle test cell cycling results are shown below in Table 1. In each example the recited N-oxide compound provided overcharge protection without requiring separate control electronics. A designation such as "80+" in the "Cycles" column indicates that the N-oxide compound continues to function as a cyclable redox shuttle after 80 cycles and that the charge/discharge test is ongoing.

TABLE 1

Coin Cell Cycling Performance Using Cycloaliphatic N-oxide Shuttle Compounds and $LiFePO_4$ positive electrodes

| Example No. | Shuttle (Concentration) | Negative Electrode (% precharged) | Lithium Salt | Charge/Discharge Rate | Cycles |
|---|---|---|---|---|---|
| 1 | TEMPO (0.1 M) | $Li_{4/3}Ti_{5/3}O_4$ (30% precharge) | LiBOB | C/20 | 2 |

TABLE 1-continued

Coin Cell Cycling Performance Using Cycloaliphatic N-oxide Shuttle Compounds and LiFePO$_4$ positive electrodes

| Example No. | Shuttle (Concentration) | Negative Electrode (% precharged) | Lithium Salt | Charge/Discharge Rate | Cycles |
|---|---|---|---|---|---|
| 2 | TEMPO (0.1 M) | Li$_{4/3}$Ti$_{5/3}$O$_4$ (30% precharge) | LiBOB | C/10 | 4 |
| 3 | TEMPO (0.3 M) | Li$_{4/3}$Ti$_{5/3}$O$_4$ (30% precharge) | LiBOB | C/20 | 21 |
| 4 | TEMPO (0.3 M) | Li$_{4/3}$Ti$_{5/3}$O$_4$ (30% precharge) | LiBOB | C/10 | 124 |
| 5 | TEMPO (0.3 M) | Li$_{4/3}$Ti$_{5/3}$O$_4$ (30% precharge) | LiBOB | C/5 | 146 |
| 6 | TEMPO (0.3 M) | Li$_{4/3}$Ti$_{5/3}$O$_4$ (30% precharge) | LiPF$_6$ | C/5 | 10 |
| 7 | TEMPO (0.3 M) | MCMB (30% precharge) | LiBOB | C/20 | 4 |
| 8 | TEMPO (0.3 M) | MCMB (30% precharge) | LiPF$_6$ | C/20 | 4 |
| 9 | 4-oxo-TEMPO (0.3 M) | Li$_{4/3}$Ti$_{5/3}$O$_4$ (50% precharge) | LiBOB | C/20 | 32 |
| 10 | 4-oxo-TEMPO (0.3 M) | Li$_{4/3}$Ti$_{5/3}$O$_4$ (50% precharge) | LiPF$_6$ | C/20 | 33 |
| 11 | 4-methoxy-TEMPO (0.1 M) | Li$_{4/3}$Ti$_{5/3}$O$_4$ (50% precharge) | LiBOB | C/10 | 80+ |
| 12 | 4-cyano-TEMPO (0.1 M) | Li$_{4/3}$Ti$_{5/3}$O$_4$ (50% precharge) | LiBOB | C/10 | 83+ |
| 13 | 3-cyano-PROXYL (0.1 M) | Li$_{4/3}$Ti$_{5/3}$O$_4$ (50% precharge) | LiBOB | C/10 | 80+ |
| 14 | 4-hydroxy-TEMPO benzoate (0.1 M) | Li$_{4/3}$Ti$_{5/3}$O$_4$ (50% precharge) | LiBOB | C/10 | 80+ |
| 15 | 4-carboxy-TEMPO (0.1 M) | Li$_{4/3}$Ti$_{5/3}$O$_4$ (50% precharge) | LiBOB | C/10 | 8+ |

Figure 2:
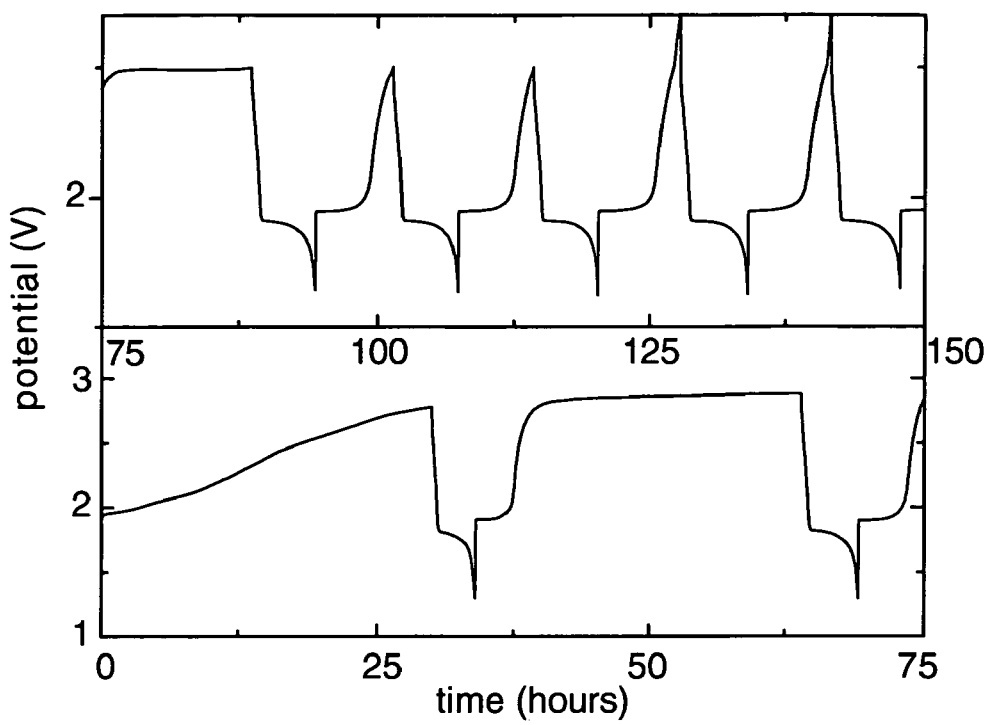
FIG. 2 and FIG. 3 respectively are plots showing cell potential during successive charge-discharge cycles for two time spans in the Example 1 and Example 2 cell charge-discharge tests.
Figure 3:
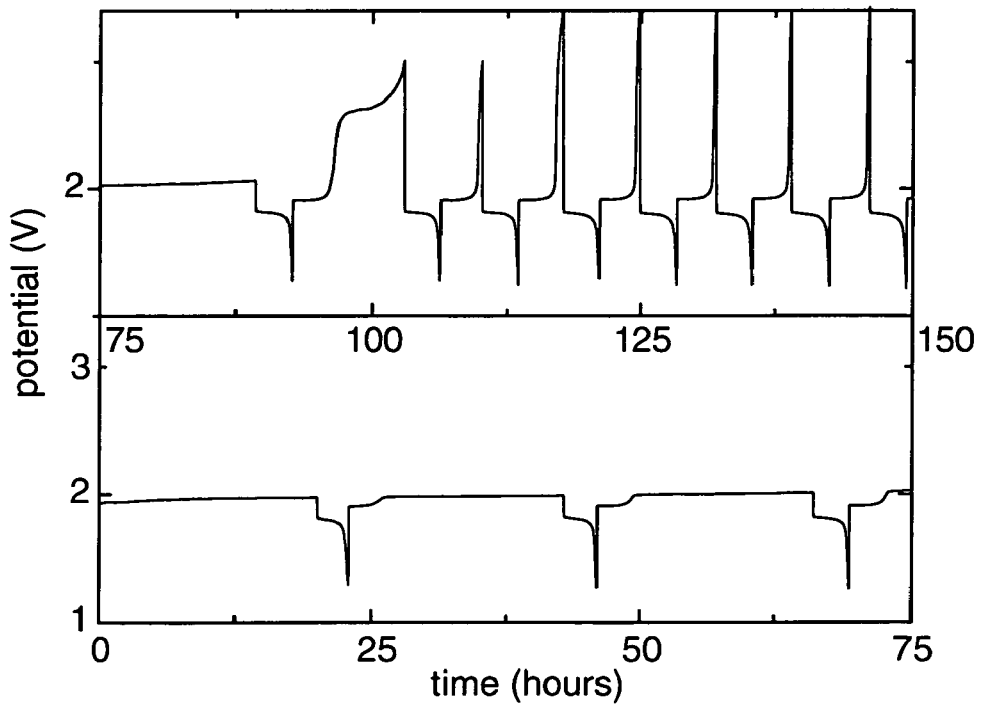

FIG. 2 and FIG. 3 show the cycle-by-cycle cell potentials for two time spans for the Example 1 and Example 2 cells (0.1 M 2,2,6,6-tetramethyl-1-piperidinyl N-oxide, TEMPO). The Example 1 cell provided two cycles before the voltage plateau indicative of shuttle activity disappeared, and the Example 2 cell provided 4 cycles.

Figure 5:
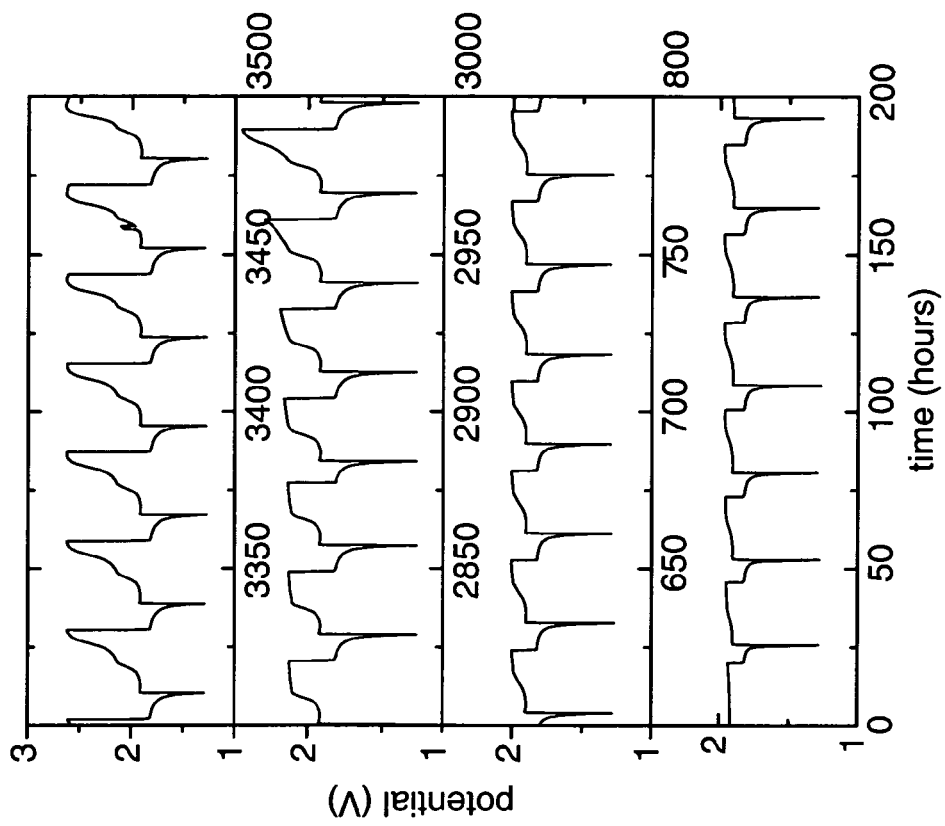
Figure 4:
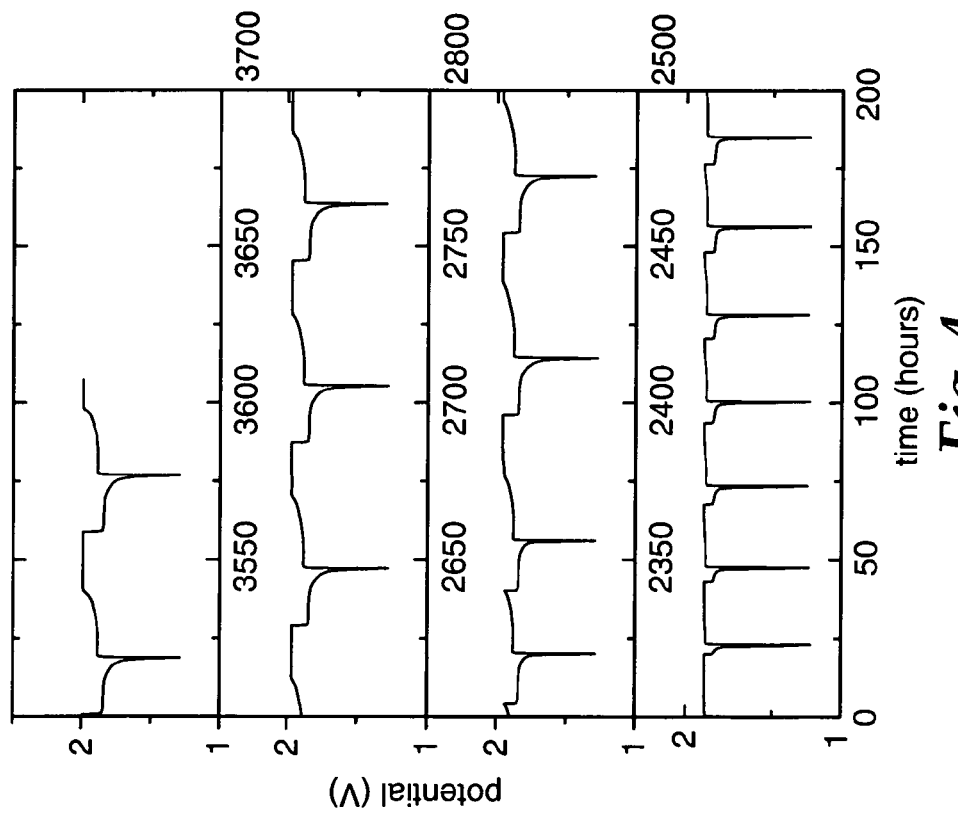
Figure 6:
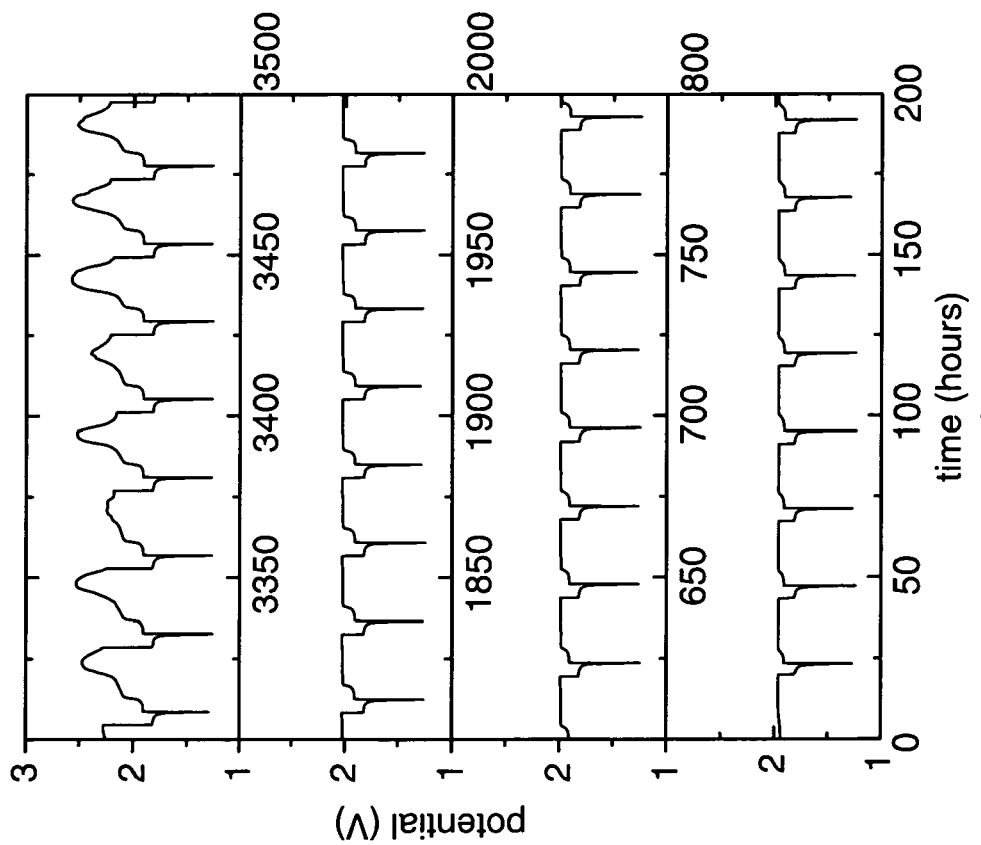

FIG. 4 through FIG. 6 respectively show the cycle-by-cycle cell potentials for four time spans (with in some instances, gaps between spans) for the Example 3 through Example 5 cells (0.3 M TEMPO). Although the same N-oxide compound and electrodes were employed, more of the N-oxide compound was dissolved in the electrolyte and improved cyclability was observed. Shuttle cycling performance apparently improved at faster charge/discharge rates, with 21, 124 and 146 cycles respectively being observed at C/20, C/10 and C/5 charge/discharge rates.

Figure 7:
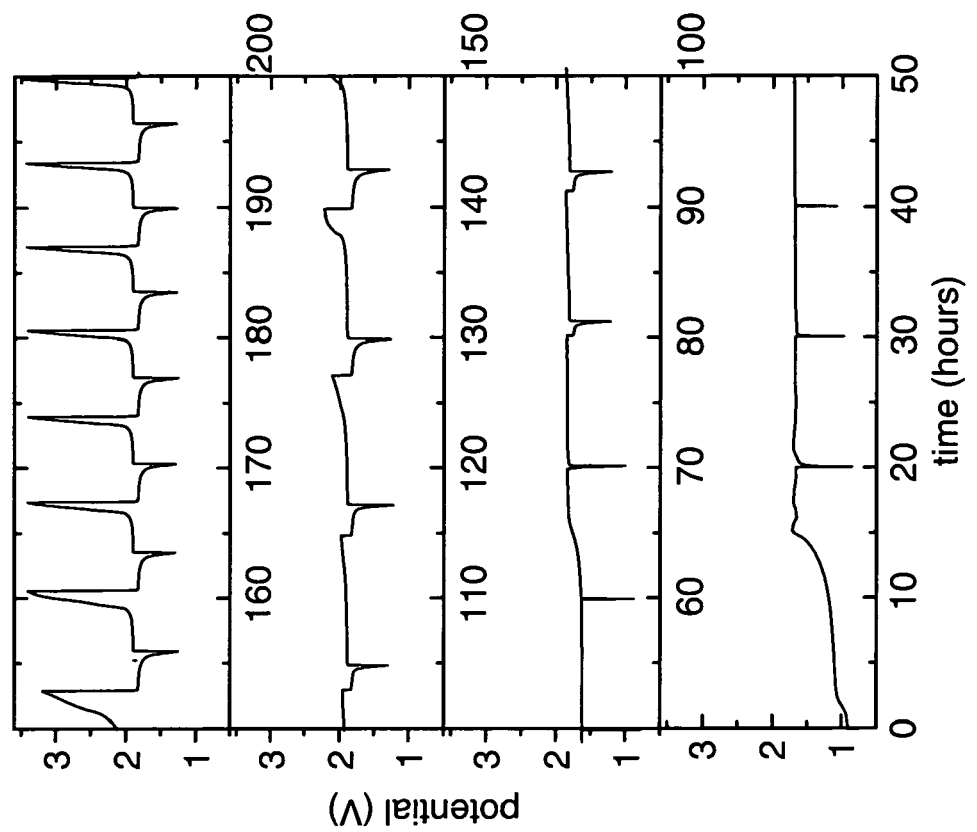
Figure 9:
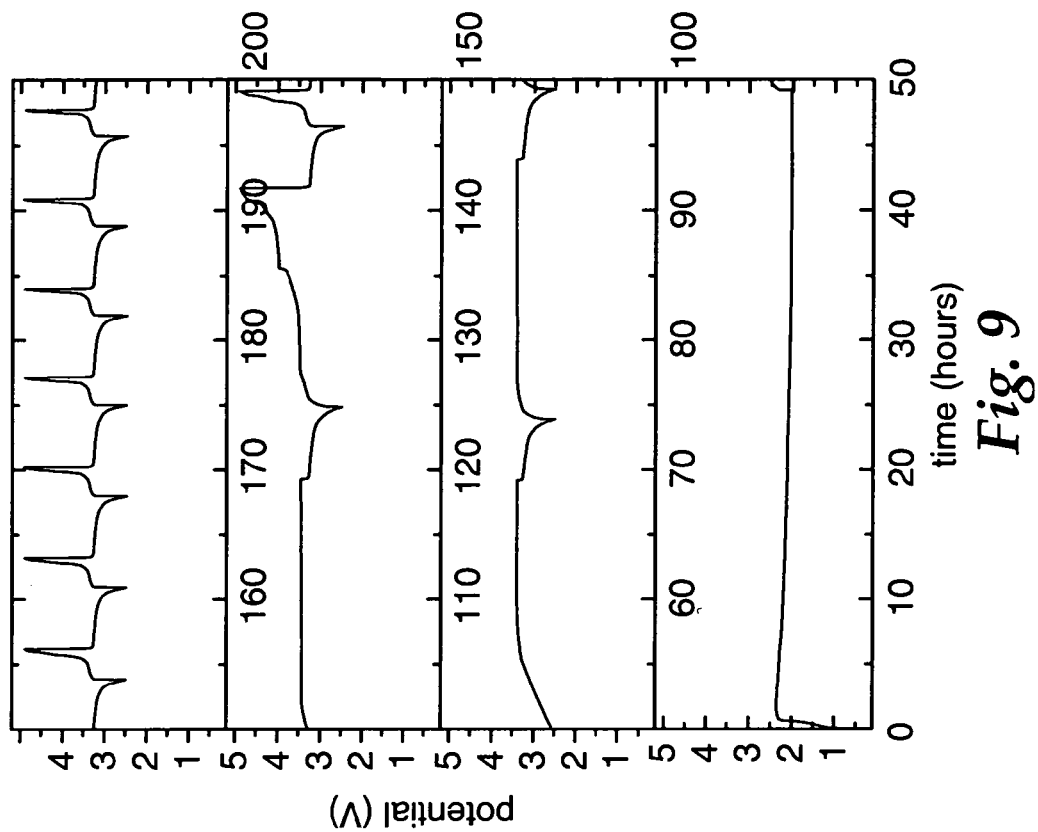
Figure 8:
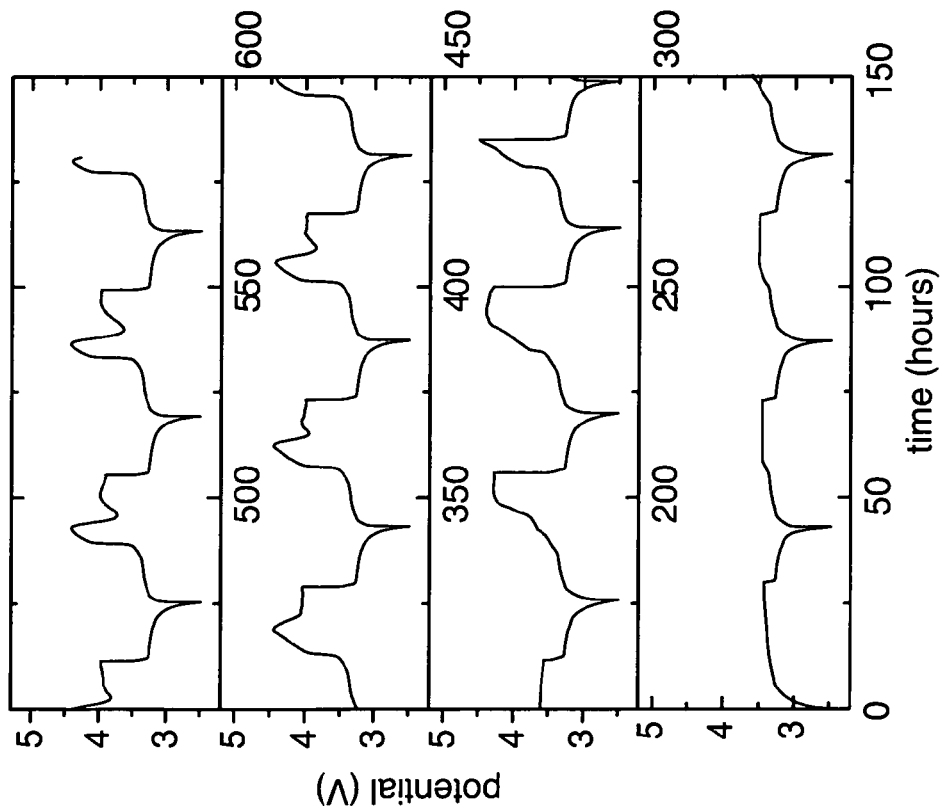
Figure 13A:
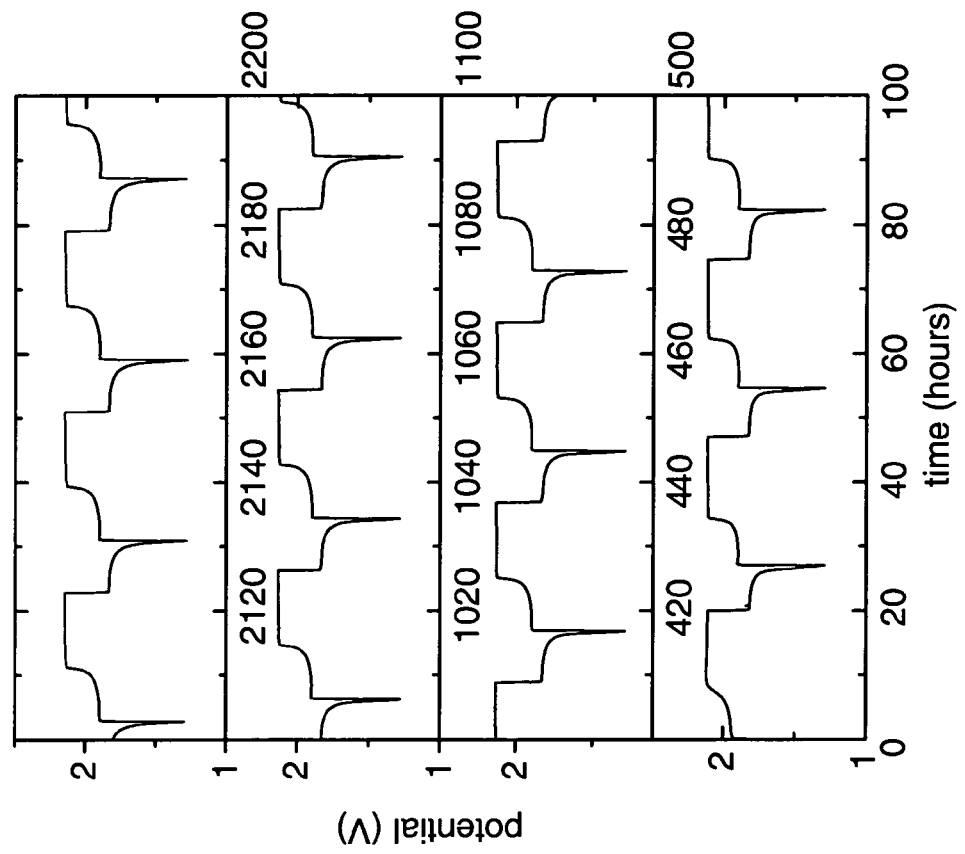
FIG. 13A is a plot showing cell potential during successive charge-discharge cycles for four time spans in the Example 12 cell charge-discharge test.
Figure 12:
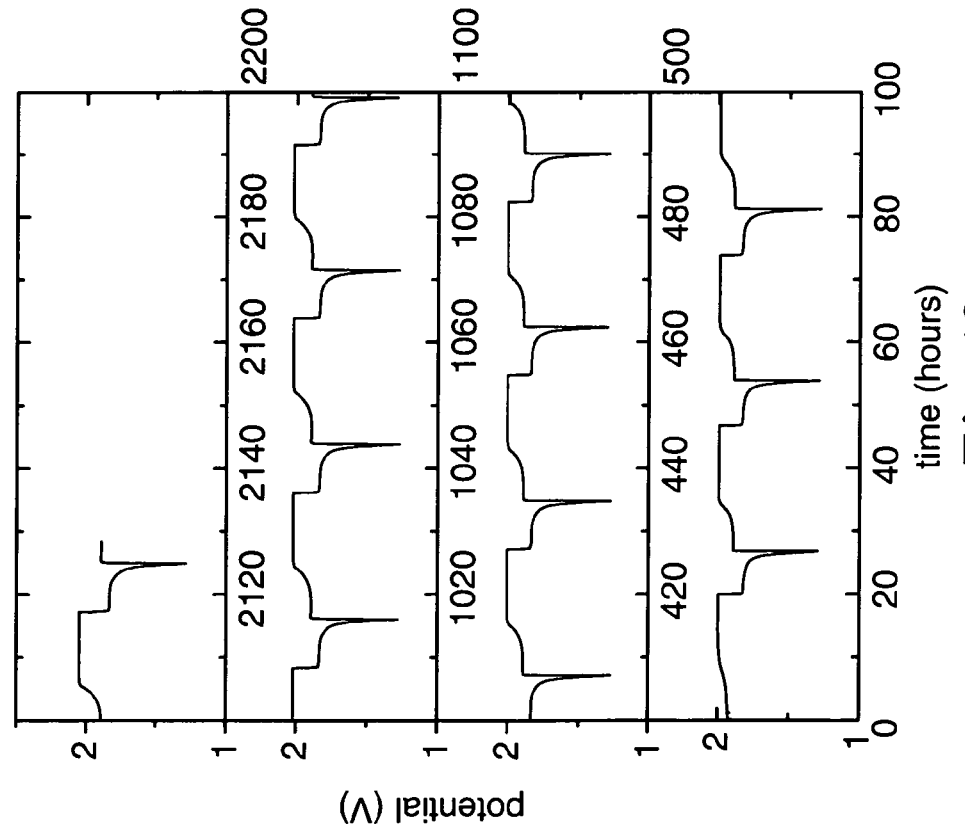
Figure 14A:
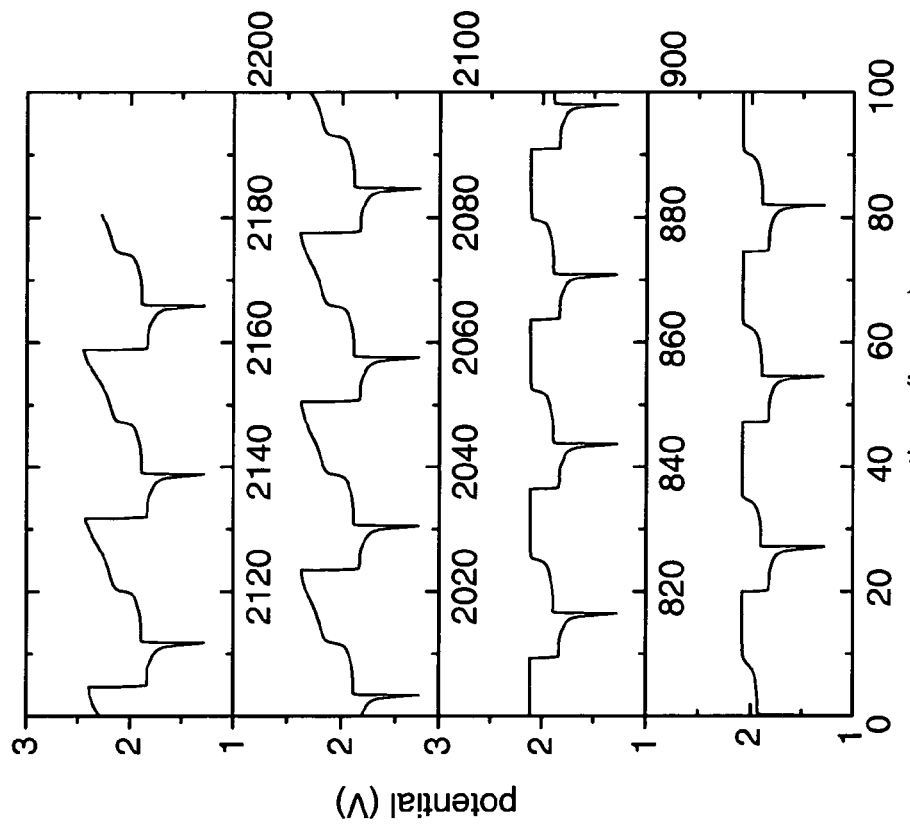
FIG. 14A is a plot showing cell potential during successive charge-discharge cycles for four time spans in the Example 13 cell charge-discharge test.
Figure 15:
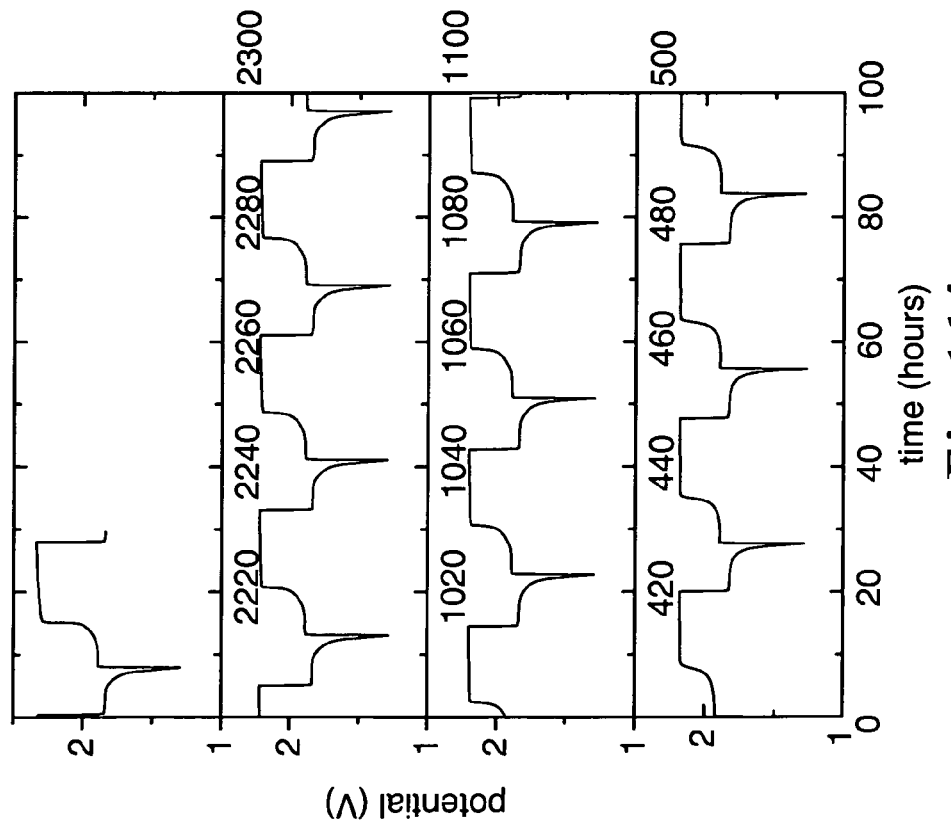
FIG. 15 is a plot showing cell potential during successive charge-discharge cycles for four time spans in the Example 14 cell charge-discharge test.

FIG. 7 through FIG. 9 respectively show the cycle-by-cycle cell potentials for four time spans for the Example 6 through Example 8 cells, which employed 0.3 M TEMPO and various combinations of negative electrode and lithium salt.

FIG. 10 and FIG. 11 show the cycle-by-cycle cell potentials for four time spans for the Example 9 and Example 10 cells (0.3 M 4-oxo-TEMPO). Both cells cycled well up to about 32 cycles at the chosen shuttle concentration and charge/discharge rate.

FIG. 12, FIG. 13A, FIG. 14A and FIG. 15 respectively show the cycle-by-cycle cell potentials for four time spans for the Example 11 through Example 14 cells, which respectively employed 0.1 M electrolyte solutions of 4-methoxy-TEMPO, 4-cyano-TEMPO, 3-cyano-PROXYL or 4-oxybenzoyl-TEMPO. All these cells continued to cycle well after 80 or more cycles at the chosen shuttle concentration and charge/discharge rate.

FIG. 13B and FIG. 14B respectively are plots showing positive electrode specific capacity vs. cycle number for the Example 12 and Example 13 cells. FIG. 13C and FIG. 14C respectively are plots showing cell potential vs. positive electrode specific capacity for the Example 12 and Example 13 cells. As shown by these plots, both cells exhibited very good capacity retention after repeated cycling.

Comparative Examples 1-7

Using the method of Example 1, Li$_{4/3}$Ti$_{5/3}$O$_4$ negative electrodes, LiFePO4 positive electrodes, 0.1 M solutions of various N-oxide compounds in a 1:2:1:2 volume ratio mixture of PC/DMC/EC/DEC charge carrying media and 0.7 M LiBOB salt were assembled as in Example 1 and evaluated at a C/10 charge/discharge rate. The tested N-oxide compounds either did not provide shuttle behavior or lasted no more than one cycle. The results are set out below in Table 2:

TABLE 2

Coin Cell Cycling Performance Using Various N-oxide Compounds and LiFePO$_4$ positive electrodes

| Comparative Example No. | N-Oxide Compound | Structure | Oxidation potential (E$_{obs}$) | Behavior |
|---|---|---|---|---|
| Comp. 1 | 2-Picoline-N-oxide | | 4.26 | Did not cycle |
| Comp. 2 | 3-Picoline-N-oxide | | 4.33 | Did not cycle |

TABLE 2-continued

Coin Cell Cycling Performance Using Various N-oxide Compounds and LiFePO$_4$ positive electrodes

| Comparative Example No. | N-Oxide Compound | Structure | Oxidation potential (E$_{obs}$) | Behavior |
|---|---|---|---|---|
| Comp. 3 | 4-Picoline-N-oxide | H$_3$C—⟨pyridine⟩—N—O | 3.29 | Did not cycle |
| Comp. 4 | 4-Methoxy-pyridine-N-oxide | MeO—⟨pyridine⟩—N—O | 4.85 | 1 cycle |
| Comp. 5 | Pyridine-N-oxide | ⟨pyridine⟩—N—O | 4.30 | 1 cycle |
| Comp. 6 | 4-tert-butylpyridine-N-oxide | (CH$_3$)$_3$C—⟨pyridine⟩—N—O | 4.34 | 1 cycle |
| Comp. 7 | 2,4-dimethylpyridine-N-oxide | H$_3$C—⟨pyridine⟩(CH$_3$)—N—O | 4.24 | 1 cycle |

Comparative Example 8

Figure 16:
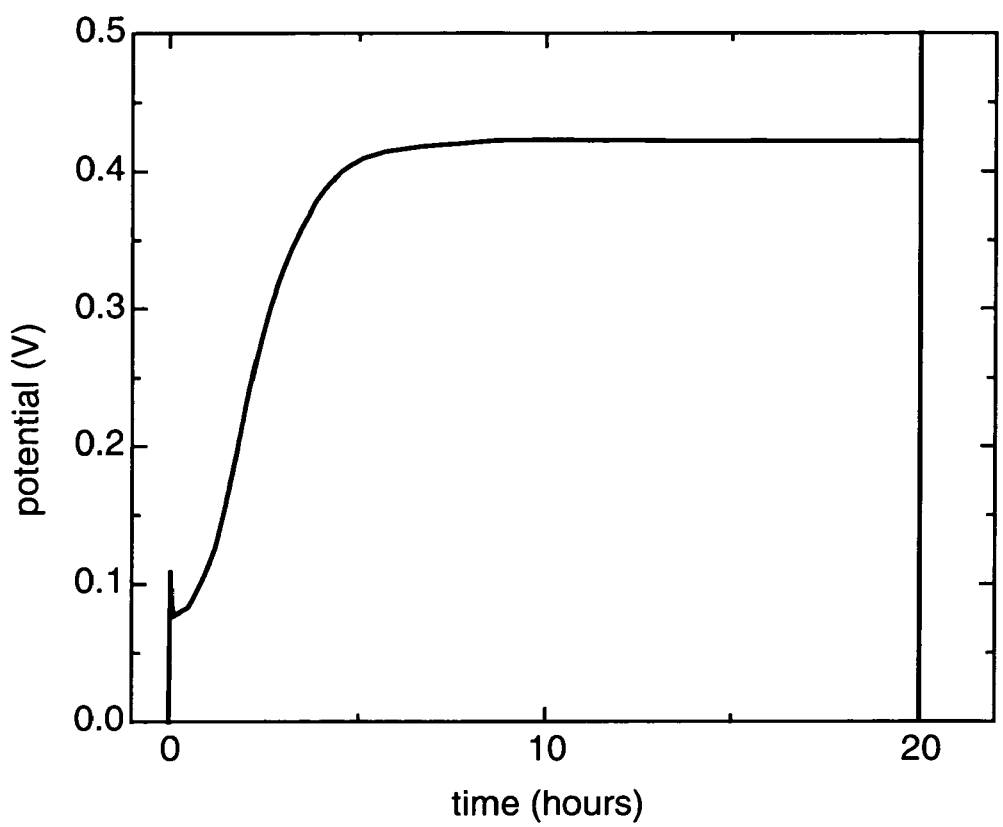
FIG. 16 is a plot showing cell potential for the Comparative Example 8 cell charge test.

A test cell was constructed using electrodes and an electrolyte like those employed in Example 1 of Japanese Published Patent Application No. 2001-332296 (Japan Storage Battery Co., Ltd.), but based on a coin cell construction like that described above rather than a spiral-wound construction as described in the patent application. The positive electrode was made from LiCoO$_2$. The negative electrode was made from graphite. 1 M LiPF$_6$ and 0.1 M TEMPO were dissolved in a charge carrying medium made from a 1:2 by volume mixture of EC:DC. LiCoO$_2$ has a recharged potential of about 4.1 V vs. Li/Li+, a value greater than the TEMPO oxidation potential (E$_{cv}$ 3.53 V vs. Li/Li$^+$). The cell was charged at a C rate. The results are shown in FIG. 16. As shown in FIG. 16, TEMPO did not provide overcharge protection for the LiCoO$_2$ positive electrode, and prevented the cell from becoming fully charged by shuttling below the recharged potential of the positive electrode.

A number of embodiments of the invention have been described. Nevertheless, it will be understood that various modifications may be made without departing from the spirit and scope of the invention. Accordingly, other embodiments are within the scope of the following claims.

We claim:

1. A rechargeable lithium-ion cell comprising:
   (a) a positive electrode having a recharged potential;
   (b) a negative electrode;
   (c) a charge-carrying electrolyte comprising a charge carrying medium and a lithium salt; and
   (d) a cyclable redox chemical shuttle comprising a cycloaliphatic N-oxide compound dissolved in the electrolyte and having an oxidation potential above the recharged potential of the positive electrode,
   wherein the positive electrode is selected from LiCoPO$_4$, LiFePO$_4$, Li$_2$FeS$_2$, Li$_2$FeSiO$_4$, LiMnPO$_4$, LiNiPO$_4$, LiVOPO$_4$F, Li$_3$V$_2$(PO$_4$)$_3$, and combinations thereof.

2. A cell according to claim 1 wherein the N-oxide compound comprises a piperidinyl or pyrrolidinyl ring.

3. A cell according to claim 1 wherein the N-oxide compound is substituted at one or more ring positions with one or more alkyl groups containing 1 to about 4 carbon atoms.

4. A cell according to claim 3 wherein the N-oxide compound has one or more alkyl groups attached to ring carbon atoms alpha- to the N-oxide compound ring nitrogen atom.

5. A cell according to claim 4 wherein the N-oxide compound has alkyl groups attached to all ring carbon atoms alpha- to the N-oxide compound ring nitrogen atom.

6. A cell according to claim 1 wherein the N-oxide compound is substituted at one or more ring positions with one or more acyl, acyloxy, alkaryl, alkoxy, acetamido, amido, amino, aryl, aralkyl, alkyl carboxyl, aryl carboxyl, alkylsulfonyl, benzoyl, carbamoyl, carbamido, carboxy, cyano, formyl, halo, haloacetamido, haloacyl, haloalkylsulfonyl, haloaryl, hydroxyl, isothiocyanato, methylsulfonyloxyl, nitro, oxo, oxybenzoyl or phosphenoxy groups or combination thereof.

7. A cell according to claim 1 wherein the cycloaliphatic N-oxide compound comprises a 3-, 4- or 5-substituted-2,2,6,6-tetraalkyl-1-piperidinyl N-oxide or a 3- or 4-substituted-2,2,5,5-tetraalkyl-1-pyrrolidinyl N-oxide, and wherein the alkyl groups have 1-4 carbon atoms.

8. A cell according to claim 1 wherein the N-oxide compound comprises 2,2,6,6-tetramethyl-1-piperidinyl N-oxide (TEMPO), 4-oxo-TEMPO, 4-methoxy-TEMPO, 4-cyano-TEMPO, 4-oxybenzoyl-TEMPO, 2,2,5,5-tetraalkyl-3-cyano-1-pyrrolidinyl N-oxide or mixture thereof.

9. A cell according to claim 1 wherein the N-oxide compound has an oxidation potential from about 0.3 V to about 5 V above the recharged potential of the positive electrode.

10. A cell according to claim 1 wherein the N-oxide compound has an oxidation potential from about 0.3 to about 0.6 V above the recharged potential of the positive electrode.

11. A cell according to claim 1 wherein the N-oxide compound provides overcharge protection after at least 30 charge-discharge cycles at a charging voltage sufficient to oxidize the N-oxide compound and at an overcharge charge flow equivalent to 100% of the cell capacity during each cycle.

12. A cell according to claim 1 wherein the N-oxide compound provides overcharge protection after at least 80 charge-discharge cycles at a charging voltage sufficient to oxidize the N-oxide compound and at an overcharge charge flow equivalent to 100% of the cell capacity during each cycle.

13. A cell according to claim 1 wherein the positive electrode comprises $LiFePO_4$, $Li_2FeSiO_4$, or combinations thereof.

14. A cell according to claim 1 wherein the negative electrode comprises graphitic carbon, lithium metal or a lithium alloy.

15. A cell according to claim 1 wherein the charge carrying medium comprises ethylene carbonate, propylene carbonate, dimethyl carbonate, diethyl carbonate or combination thereof.

16. A rechargeable lithium-ion cell comprising:
   (a) a positive electrode having a recharged potential and comprising $LiFePO_4$, $Li_2FeSiO_4$, or combinations thereof
   (b) a negative electrode comprising graphitic carbon, lithium metal or a lithium alloy; and
   (c) a charge-carrying electrolyte comprising:
      (i) a charge-carrying media comprising ethylene carbonate, propylene carbonate, dimethyl carbonate, diethyl carbonate or combination thereof;
      (ii) a lithium salt comprising $LiPF_6$, lithium bis(oxalato) borate or combination thereof; and
      (iii) a cyclable redox chemical shuttle comprising 2,2,6,6-tetramethyl-1-piperidinyl N-oxide (TEMPO), 4-oxo-TEMPO, 4-methoxy-TEMPO, 4-cyano-TEMPO, 4-oxybenzoyl-TEMPO, 2,2,5,5-tetraalkyl-3-cyano-1-pyrrolidinyl N-oxide or mixture thereof dissolved in the electrolyte and having an oxidation potential above the recharged potential of the positive electrode.

17. A method for manufacturing a rechargeable lithium-ion sealed cell comprising the steps of assembling in any order and enclosing in a suitable case:
   (a) a positive electrode having a recharged potential;
   (b) a negative electrode;
   (c) a charge-carrying electrolyte comprising charge a carrying medium and a lithium salt; and
   (d) a cyclable redox chemical shuttle comprising a cycloaliphatic N-oxide compound dissolved in or dissolvable in the electrolyte and having an oxidation potential above the recharged potential of the positive electrode, wherein the positive electrode is selected from $LiCoPO_4$, $LiFePO_4$, $Li_2FeS_2$, $Li_2FeSiO_4$, $LiMnPO_4$, $LiNiPO_4$, $LiVOPO_4F$, $Li_3V_2(PO_4)_3$, or combinations thereof.

18. A method for recharging a lithium-ion cell while chemically limiting cell damage due to overcharging comprising supplying charging current across a positive and a negative electrode of a lithium-ion rechargeable cell containing a charge-carrying electrolyte comprising a charge carrying medium, a lithium salt and a cyclable redox chemical shuttle comprising a cycloaliphatic N-oxide compound dissolved in the electrolyte and having an oxidation potential above the recharged potential of the positive electrode, wherein the positive electrode is selected from $LiCoPO_4$, $LiFePO_4$, $Li_2FeS_2$, $Li_2FeSiO_4$, $LiMnPO_4$, $LiNiPO_4$, $LiVOPO_4F$, $Li_3V_2(PO_4)_3$, or combinations thereof.

* * * * *

UNITED STATES PATENT AND TRADEMARK OFFICE
CERTIFICATE OF CORRECTION

PATENT NO. : 7,615,317 B2  
APPLICATION NO. : 11/130849  
DATED : November 10, 2009  
INVENTOR(S) : Dahn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Nineteenth Day of October, 2010

David J. Kappos
*Director of the United States Patent and Trademark Office*